(12) United States Patent
Kang (10) Patent No.: US 12,509,157 B2
(45) Date of Patent: Dec. 30, 2025

(54) VEHICULAR CENTER PILLAR

(71) Applicants: Hyundai Motor Company, Seoul (KR); Kia Corporation, Seoul (KR)

(72) Inventor: Kyung Bum Kang, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 389 days.

(21) Appl. No.: 18/185,613

(22) Filed: Mar. 17, 2023

(65) Prior Publication Data

US 2024/0051607 A1 Feb. 15, 2024

(30) Foreign Application Priority Data

Aug. 11, 2022 (KR) .......................... 10-2022-0100934

(51) Int. Cl.
  *B62D 25/04* (2006.01)
  *B62D 21/15* (2006.01)
  *B62D 27/02* (2006.01)
(52) U.S. Cl.
  CPC ........... *B62D 25/04* (2013.01); *B62D 21/157* (2013.01); *B62D 27/023* (2013.01)

(58) Field of Classification Search
  CPC ...... B62D 25/04; B62D 25/023; B62D 21/157
  USPC ........................... 296/193.06, 29, 30, 187.12
  See application file for complete search history.

(56) References Cited

U.S. PATENT DOCUMENTS

| | | | |
|---|---|---|---|
| 6,474,726 B1 * | 11/2002 | Hanakawa | B62D 25/04 296/203.03 |
| 8,491,046 B2 * | 7/2013 | Nagai | B62D 25/02 296/193.06 |
| 10,576,923 B2 * | 3/2020 | Tanaka | B60R 21/0132 |
| 10,814,915 B2 * | 10/2020 | Onishi | B62D 25/04 |
| 2017/0036701 A1 * | 2/2017 | Yamada | B62D 29/002 |

* cited by examiner

*Primary Examiner* — Dennis H Pedder
(74) *Attorney, Agent, or Firm* — Fish & Richardson P.C.

(57) ABSTRACT

A vehicular center pillar includes a pillar outer panel including an upper outer portion and a lower outer portion divided by a beltline, a pillar inner panel including an upper inner portion and a lower inner portion divided by the beltline, and an upper reinforcing member disposed between the upper outer portion and the upper inner portion, and having a flange extending toward a door opening, wherein the upper outer portion has a first flange extending toward the door opening, and the flange of the upper reinforcing member is fixed to the first flange of the upper outer portion.

19 Claims, 4 Drawing Sheets

VEHICULAR CENTER PILLAR

CROSS-REFERENCE TO RELATED APPLICATION

This application is based on and claims the benefit of priority to Korean Patent Application No. 10-2022-0100934, filed on Aug. 11, 2022, in the Korean Intellectual Property Office, the disclosure of which is incorporated herein in its entirety by reference.

TECHNICAL FIELD

The present disclosure relates to a vehicular center pillar, and more particularly, to a vehicular center pillar designed to improve roof strength and side crash performance (crashworthiness).

BACKGROUND

A vehicle includes a front pillar, a center pillar, and a rear pillar supporting a roof. The front pillar (referred to as "A pillar") is located in front of a front door opening, the center pillar (referred to as "B pillar") is located between the front door opening and a rear door opening, and the rear pillar (referred to as "C pillar") is located behind the rear door opening.

The center pillar may extend upwardly from a side sill toward the roof, and the center pillar may support a front door and a rear door. The center pillar may be designed to provide structural stiffness of a vehicle body and improve crash performance (crashworthiness) and roof strength, thereby protecting a passenger compartment.

An upper portion of the center pillar may affect the roof strength, and a lower portion of the center pillar may affect the crash performance. Accordingly, the upper portion of the center pillar may need to improve its cross-section stiffness in order to improve the roof strength, and the lower portion of the center pillar may need to improve its cross-section stiffness and strength of a pillar inner panel in order to improve the crash performance.

However, in order for the center pillar according to the related art to meet requirements for improving the roof strength and the crash performance, the strength and thickness of the pillar inner panel may unnecessarily increase, and the thickness of a reinforcing member also needs to be increased, so the weight of the center pillar may relatively increase.

The above information described in this background section is provided to assist in understanding the background of the present disclosure, and may include any technical concept which is not considered as the prior art that is already known to those skilled in the art.

SUMMARY

An aspect of the present disclosure provides a vehicular center pillar designed to improve roof strength and side crash performance (crashworthiness), and optimize strength and thicknesses of elements/components.

According to an aspect of the present disclosure, a vehicular center pillar includes: a pillar outer panel including an upper outer portion and a lower outer portion divided by a beltline; a pillar inner panel including an upper inner portion and a lower inner portion divided by the beltline; an upper reinforcing member disposed between the upper outer portion and the upper inner portion, and having a flange extending toward a door opening; and a lower reinforcing member disposed between the lower outer portion of the pillar outer panel and the lower inner portion of the pillar inner panel. The upper outer portion includes a first flange extending toward the door opening, and the flange of the upper reinforcing member may be fixed to the first flange of the upper outer portion.

The upper inner portion may be fixed to the upper reinforcing member.

The upper reinforcing member may include a reinforcing wall recessed from the flange toward the upper outer portion, and, a joint wall raised from the reinforcing wall toward the upper inner portion. The upper inner portion may include a first joint wall fixed to the joint wall of the upper reinforcing member.

The upper inner portion may include a first recessed wall recessed from the first joint wall toward the upper outer portion. The reinforcing wall of the upper reinforcing member may face the first recessed wall of the upper inner portion.

The upper inner portion may have a cut-out portion aligned with the flange of the upper reinforcing member, and the flange of the upper reinforcing member may be exposed through the cut-out portion of the upper inner portion.

The cut-out portion may be defined by a longitudinal edge extending along the length of the upper inner portion and a transverse edge extending along the width of the upper inner portion, and the transverse edge may be aligned with the beltline.

The lower reinforcing member may be fixed to the lower inner portion.

The lower outer portion may have a second flange extending toward the door opening, the lower inner portion may have a flange extending toward the door opening, and the flange of the lower inner portion may be fixed to the second flange of the lower outer portion.

The lower inner portion may include a second joint wall which is closer to the center of the lower inner portion than the flange of the lower inner portion. The lower reinforcing member may include a reinforcing wall facing the lower outer portion, and a flange raised from the reinforcing wall toward the lower inner portion. The flange of the lower reinforcing member may be fixed to the second joint wall of the lower inner portion.

The lower inner portion may include a second recessed wall recessed from the second joint wall toward the lower outer portion. The reinforcing wall of the lower reinforcing member may face the second recessed wall of the lower inner portion.

A bottom end of the upper reinforcing member may be located below the beltline. The upper reinforcing member may have a first lower edge provided on the bottom end thereof, a second lower edge located above the first lower edge, and a third lower edge connecting the first lower edge and the second lower edge.

A top end of the lower reinforcing member may be located above the beltline. The lower reinforcing member may include a first upper edge provided on the top end thereof, and a second upper edge extending obliquely and downwardly from the first upper edge.

A lower portion of the upper reinforcing member and an upper portion of the lower reinforcing member may be overlapped to have a predetermined overlap area, and the lower portion of the upper reinforcing member may be joined to the upper portion of the lower reinforcing member by spot welding.

A strength of the pillar outer panel may be the same as that of the upper reinforcing member, a strength of the pillar inner panel may be lower than that of the pillar outer panel, and a strength of the lower reinforcing member may be lower than that of the pillar inner panel.

A thickness of the upper reinforcing member may be greater than that of the pillar outer panel, and a thickness of the lower reinforcing member may be greater than that of the pillar inner panel.

The pillar outer panel and the upper reinforcing member may include hot stamped steel.

The pillar inner panel and the lower reinforcing member may include cold rolled steel.

DETAILED DESCRIPTION

Hereinafter, exemplary implementations of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Figure 1:
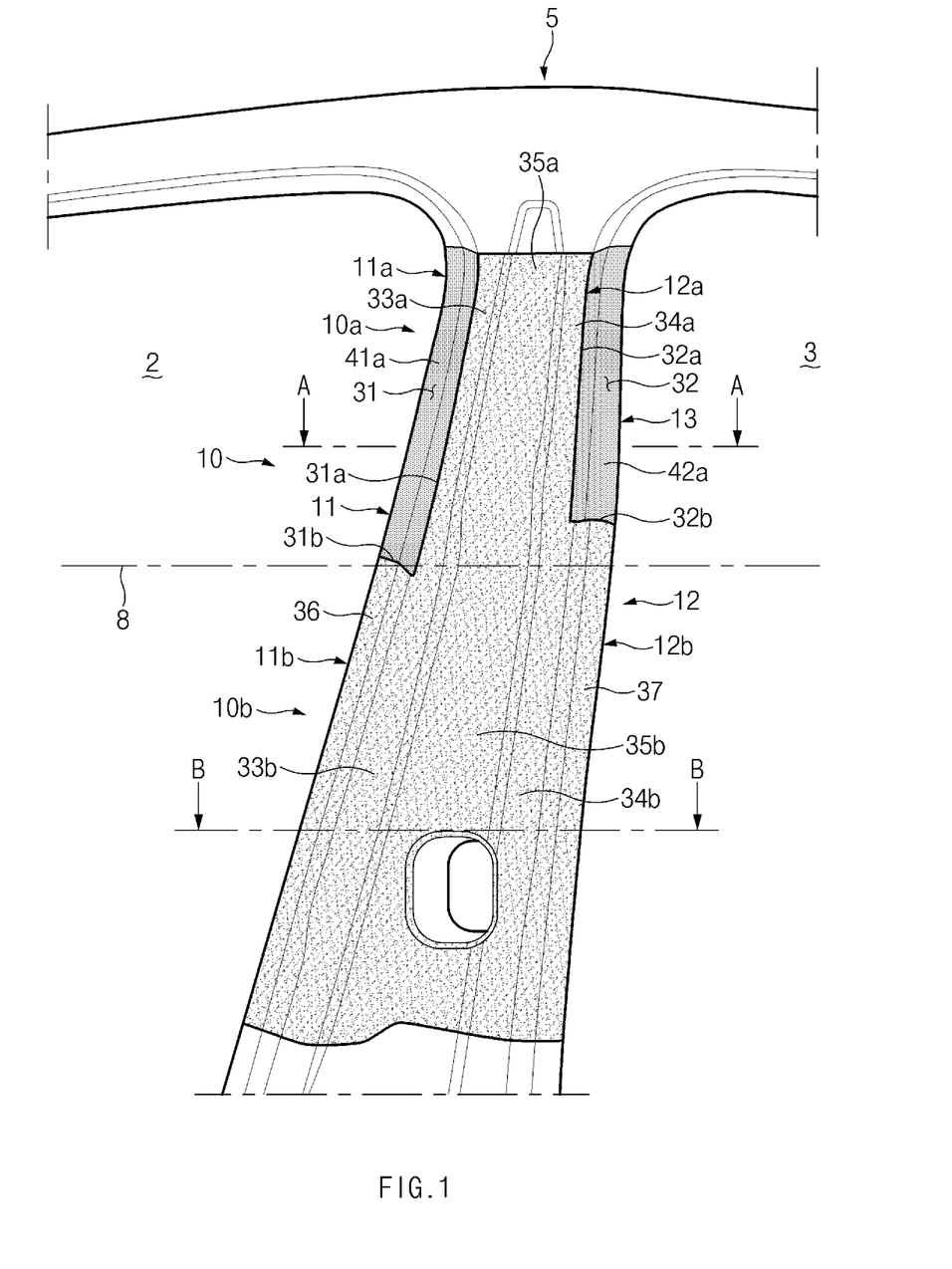
FIG. 1 illustrates an example of a vehicular center pillar viewed from an interior of a vehicle.
Figure 2:
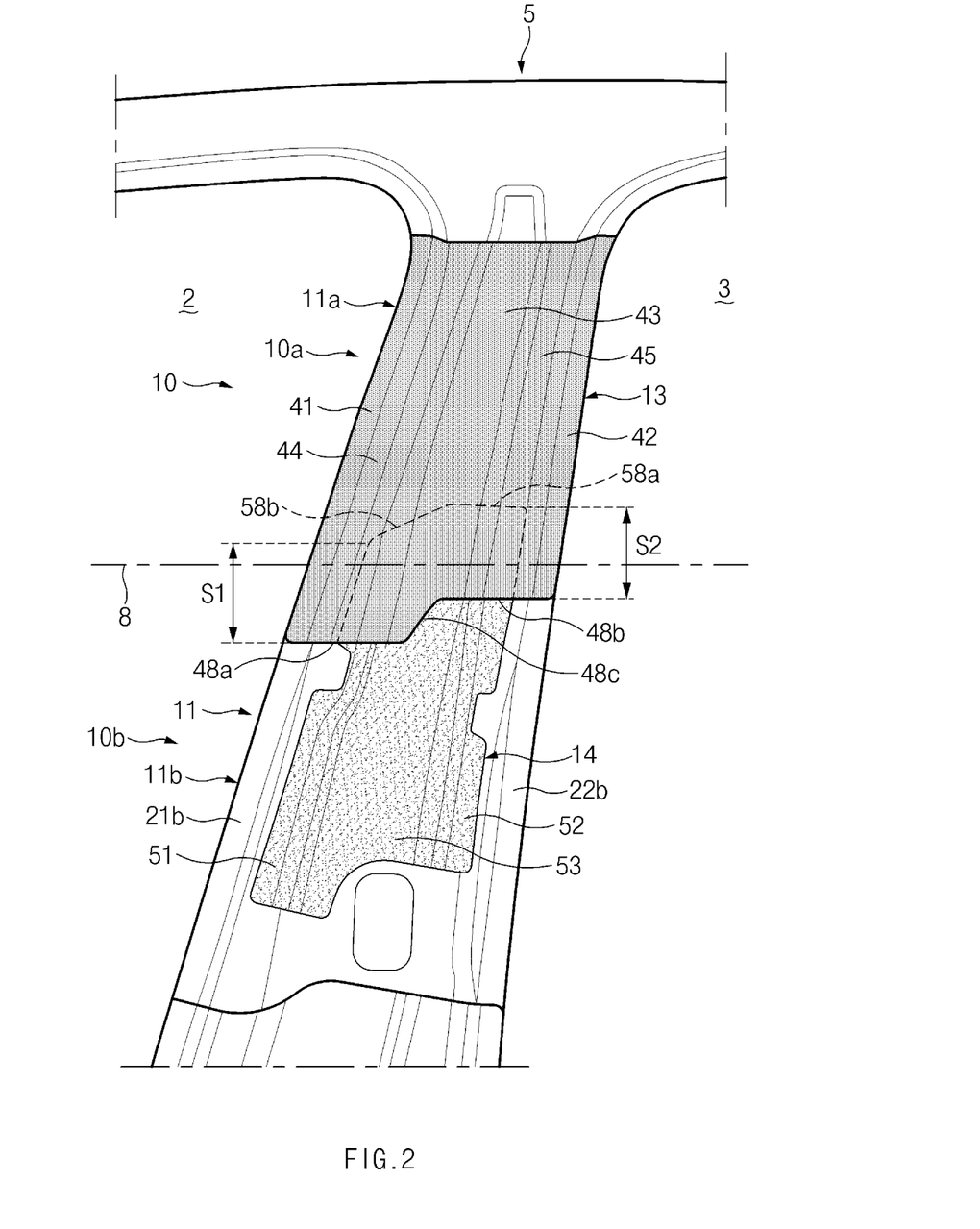
FIG. 2 illustrates the vehicular center pillar illustrated in FIG. 1, from which a pillar inner panel is removed.

Referring to FIGS. 1 and 2, in some implementations, a vehicular center pillar 10 may be located between a front door opening 2 and a rear door opening 3, and extend vertically from a side sill to a roof. A bottom end of the center pillar 10 may be connected to the side sill, and a top end of the center pillar may be connected to a roof side rail 5. Accordingly, the center pillar 10 may support the roof of the vehicle.

The center pillar 10 may be divided into an upper portion 10a and a lower portion 10b with respect to a reference line (e.g., a beltline 8). The upper portion 10a of the center pillar refers to a portion of the center pillar 10 located above the beltline 8, and the lower portion 10b of the center pillar 10 refers to a portion of the center pillar 10 located below the beltline 8. The beltline 8 refers to a line extending along a bottom edge of the vehicle's glass (windscreen, side window, rear window, etc.), and the beltline 8 may extend along a longitudinal direction of the vehicle.

The center pillar 10 may include a front flange portion facing the front door opening 2, and a rear flange portion facing the rear door opening 3. The front flange portion may support a front door, and various components (for example, a striker) may be mounted on the front flange portion. Accordingly, the front flange portion may have an appropriate design thickness. The rear flange portion may support a rear door, and various components (for example, a hinge) may be mounted on the rear flange portion. Accordingly, the rear flange portion may have an appropriate design thickness.

Referring to FIGS. 1 to 4, the vehicular center pillar may include a pillar outer panel 11 facing the exterior of the vehicle, and a pillar inner panel 12 facing the interior of the vehicle.

The pillar outer panel 11 may extend in a vertical direction of the vehicle. The pillar outer panel 11 may include a channel-shaped body having basic stiffness, front flanges 21a and 21b extending from the channel-shaped body toward the front door opening 2, and rear flanges 22a and 22b extending from the channel-shaped body toward the rear door opening 3.

The pillar outer panel 11 may have an upper outer portion 11a and a lower outer portion 11b divided by the beltline 8, and the lower outer portion 11b may extend continuously from the upper outer portion 11a along the length of the center pillar 10. The upper outer portion 11a of the pillar outer panel 11 may correspond to the upper portion 10a of the center pillar 10, and the lower outer portion 11b of the pillar outer panel 11 may correspond to the lower portion 10b of the center pillar 10.

Figure 3:
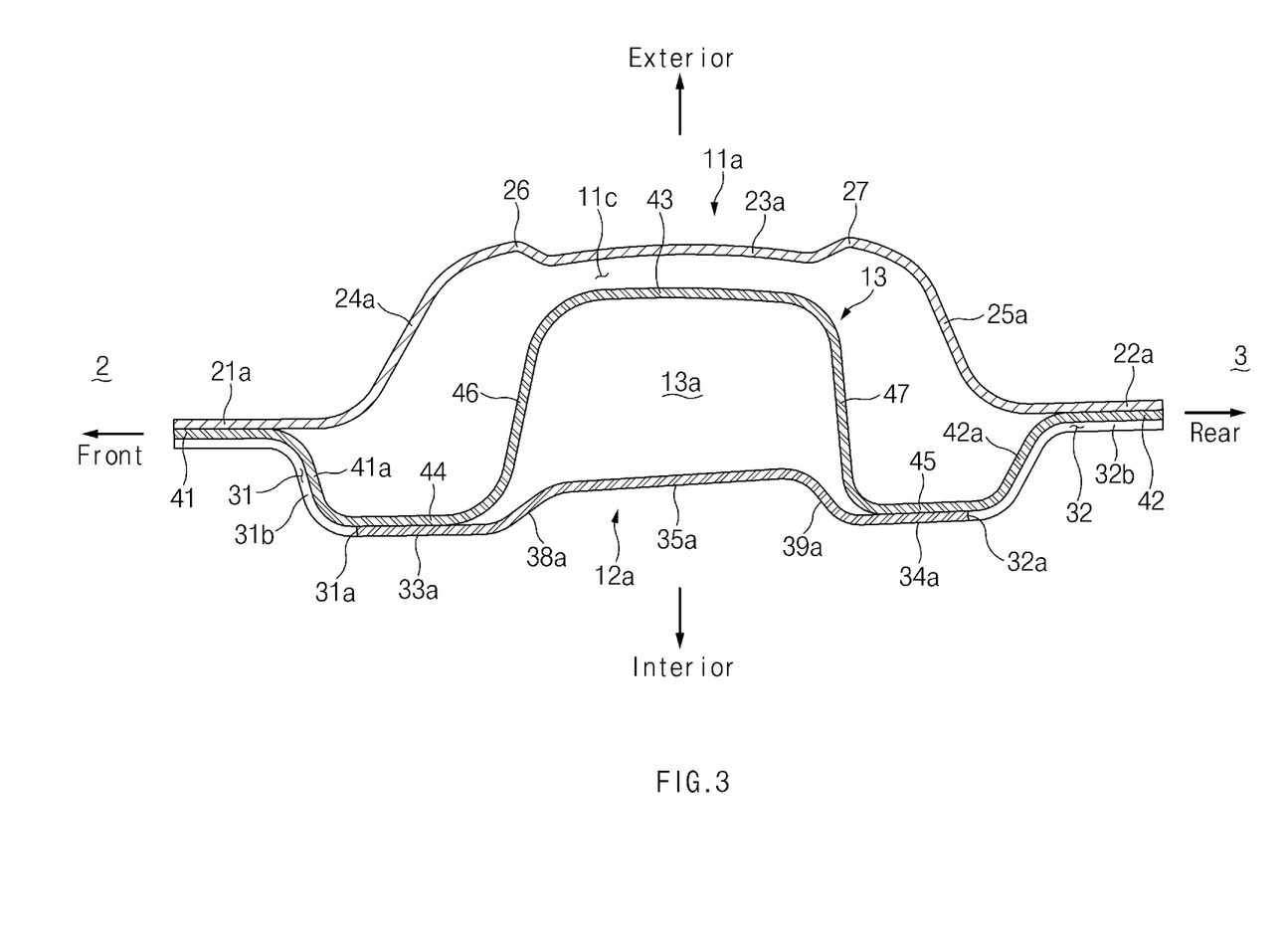
FIG. 3 illustrates a cross-sectional view, taken along line A-A of FIG. 1.

Referring to FIG. 3, the upper outer portion 11a of the pillar outer panel 11 may include a channel-shaped upper body, a first front flange 21a extending from the channel-shaped upper body toward the front door opening 2, and a first rear flange 22a extending from the channel-shaped lower body toward the rear door opening 3.

The upper outer portion 11a of the pillar outer panel 11 may include a first outboard wall 23a facing the exterior of the vehicle, a first front wall 24a connected to a front edge of the first outboard wall 23a, and a first rear wall 25a connected to a rear edge of the first outboard wall 23a. The first outboard wall 23a, the first front wall 24a, and the first rear wall 25a may form the channel-shaped upper body. The first outboard wall 23a may be flat. The first front wall 24a may face the front of the vehicle, and the first front wall 24a may extend obliquely from the first outboard wall 23a to the first front flange 21a. The first rear wall 25a may face the rear of the vehicle, and the first rear wall 25a may extend obliquely from the first outboard wall 23a to the first rear flange 22a. The first front wall 24a and the first rear wall 25a may extend from the first outboard wall 23a toward the interior of the vehicle. The upper outer portion 11a of the pillar outer panel 11 may have an upper cavity 11c defined by the first outboard wall 23a, the first front wall 24a, and the first rear wall 25a.

The upper outer portion 11a of the pillar outer panel 11 may include a front bead 26 provided on the front edge of the first outboard wall 23a, and a rear bead 27 provided on the rear edge of the first outboard wall 23a. The front bead 26 may be raised toward the exterior of the vehicle between the front edge of the first outboard wall 23a and the first front wall 24a, and the rear bead 27 may be raised toward the exterior of the vehicle between the rear edge of the first outboard wall 23a and the first rear wall 25a. The front bead 26 and the rear bead 27 may increase stiffness of the upper outer portion 11a of the pillar outer panel 11.

Figure 4:
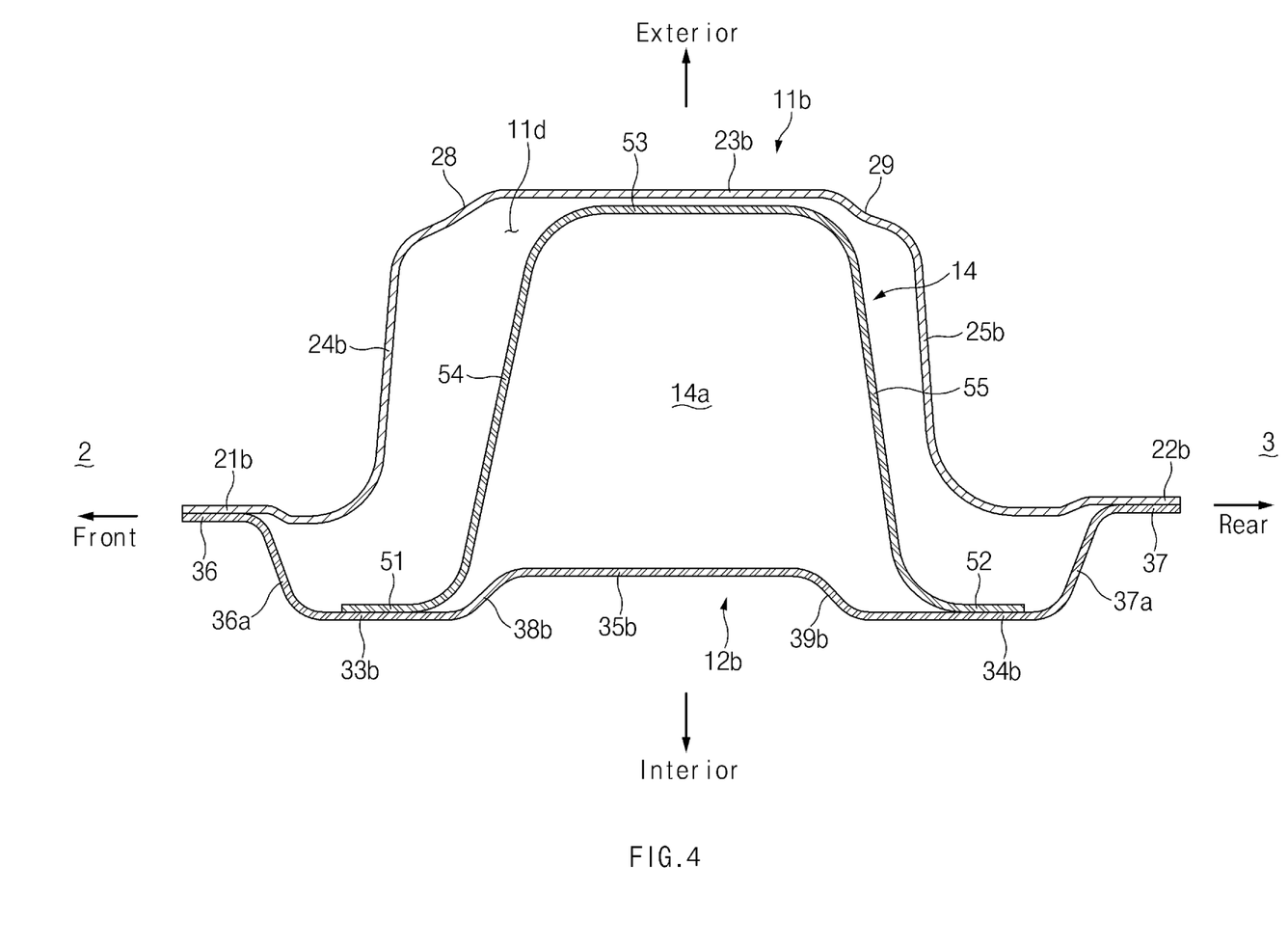
FIG. 4 illustrates a cross-sectional view, taken along line B-B of FIG. 1.

Referring to FIG. 4, the lower outer portion 11b of the pillar outer panel 11 may include a channel-shaped lower body, a second front flange 21b extending from the channel-shaped lower body toward the front door opening 2, and a second rear flange 22b extending from the channel-shaped lower body toward the rear door opening 3. The second front flange 21b of the lower outer portion 11b may extend continuously from the first front flange 21a of the upper outer portion 11a, and the second rear flange 22b of the lower outer portion 11b may extend continuously from the first rear flange 22a of the upper outer portion 11a.

The lower outer portion 11b of the pillar outer panel 11 may include a second outboard wall 23b facing the exterior of the vehicle, a second front wall 24b connected to a front edge of the second outboard wall 23b, and a second rear wall 25b connected to a rear edge of the second outboard wall 23b.

For example, the second outboard wall 23b, the second front wall 24b, and the second rear wall 25b may form the channel-shaped lower body. The second outboard wall 23b may be flat. The second front wall 24b may face the front of the vehicle, and the second front wall 24b may extend from the second outboard wall 23b to the second front flange 21b.

The second rear wall 25b may face the rear of the vehicle, and the second rear wall 25b may extend from the second outboard wall 23b to the second rear flange 22b. The second front wall 24b and the second rear wall 25b may extend from the second outboard wall 23b toward the interior of the vehicle.

The lower outer portion 11b of the pillar outer panel 11 may have a lower cavity 11d defined by the second outboard wall 23b, the second front wall 24b, and the second rear wall 25b. The second outboard wall 23b of the lower outer portion 11b may extend continuously from the first outboard wall 23a of the upper outer portion 11a, the second front wall 24b of the lower outer portion 11b may extend continuously from the first front wall 24a of the upper outer portion 11a, and the second rear wall 25b of the lower outer portion 11b may extend continuously from the first rear wall 25a of the upper outer portion 11a.

The lower outer portion 11b of the pillar outer panel 11 may include a front inclined wall 28 provided on the front edge of the second outboard wall 23b, and a rear inclined wall 29 provided on the rear edge of the second outboard wall 23b. The front inclined wall 28 may extend obliquely from the front edge of the second outboard wall 23b to the second front wall 24b, and the rear inclined wall 29 may extend obliquely from the rear edge of the second outboard wall 23b to the second rear wall 25b. The front inclined wall 28 and the rear inclined wall 29 may include stiffness of the lower outer portion 11b of the pillar outer panel 11.

The pillar inner panel 12 may extend in the vertical direction of the vehicle. The pillar inner panel 12 may include a channel-shaped body having basic stiffness, a front flange 36 extending from the channel-shaped body toward the front door opening 2, and a rear flange 37 extending from the channel-shaped body toward the rear door opening 3.

The pillar inner panel 12 may have an upper inner portion 12a and a lower inner portion 12b divided by the beltline 8, and the lower inner portion 12b may extend continuously from the upper inner portion 12a along the length of the center pillar 10. The upper inner portion 12a of the pillar inner panel 12 may correspond to the upper portion 10a of the center pillar 10 and the upper outer portion 11a of the pillar outer panel 11, and the lower inner portion 12b of the pillar inner panel 12 may correspond to the lower portion 10b of the center pillar 10 and the lower outer portion 11b of the pillar outer panel 11.

Referring to FIG. 3, the upper inner portion 12a of the pillar inner panel 12 may include a channel-shaped upper body, a first front joint wall 33a extending from the channel-shaped upper body toward the front door opening 2, and a first rear joint wall 34a extending from the channel-shaped upper body toward the rear door opening 3. The first front joint wall 33a and the first rear joint wall 34a may be flat, and the first front joint wall 33a may be aligned with the first rear joint wall 34a along the longitudinal direction of the vehicle.

Referring to FIGS. 1 and 3, the upper inner portion 12a of the pillar inner panel 12 may include a front cut-out portion 31 located in front of the first front joint wall 33a, and a rear cut-out portion 32 located behind the first rear joint wall 34a.

The front cut-out portion 31 may extend along the length of the upper inner portion 12a of the pillar inner panel 12, and the front cut-out portion 31 may be defined by a longitudinal edge 31a and a transverse edge 31b. The longitudinal edge 31a may extend along the length of the upper inner portion 12a of the pillar inner panel 12, and the transverse edge 31b may extend along the width of the upper inner portion 12a of the pillar inner panel 12. In particular, the transverse edge 31b may be provided on a bottom end of the upper inner portion 12a of the pillar inner panel 12, and the transverse edge 31b may be aligned with the beltline 8.

The rear cut-out portion 32 may extend along the length of the upper inner portion 12a of the pillar inner panel 12, and the rear cut-out portion 32 may be defined by a longitudinal edge 32a and a transverse edge 32b. The longitudinal edge 32a may extend along the length of the upper inner portion 12a of the pillar inner panel 12, and the transverse edge 32b may extend along the width of the upper inner portion 12a of the pillar inner panel 12. In particular, the transverse edge 32b may be provided on a bottom end of the upper inner portion 12a of the pillar inner panel 12. The transverse edge 32b of the rear cut-out portion 32 may be located above the transverse edge 31b of the front cut-out portion 31 and the beltline 8, and accordingly a length of the rear cut-out portion 32 may be less than that of the front cut-out portion 31.

The first front joint wall 33a may be closer to the center of the upper inner portion 12a of the pillar inner panel 12 than the front cut-out portion 31. The first rear joint wall 34a may be closer to the center of the upper inner portion 12a of the pillar inner panel 12 than the rear cut-out portion 32.

The upper inner portion 12a of the pillar inner panel 12 may include a first recessed wall 35a recessed from the first front joint wall 33a and the first rear joint wall 34a toward the exterior of the vehicle, a first front connection wall 38a extending from a front edge of the first recessed wall 35a to the first front joint wall 33a, and a first rear connection wall 39a extending from a rear edge of the first recessed wall 35a to the first rear joint wall 34a.

In some examples, the first recessed wall 35a may be recessed from the first front joint wall 33a and the first rear joint wall 34a toward the upper outer portion 11a of the pillar outer panel 11. The first recessed wall 35a may be flat, and the first front connection wall 38a and the first rear connection wall 39a may be inclined. The first front joint wall 33a, the first rear joint wall 34a, the first recessed wall 35a, the first front connection wall 38a, and the first rear connection wall 39a may form the channel-shaped upper body.

Referring to FIG. 4, the lower inner portion 12b of the pillar inner panel 12 may include a channel-shaped lower body, the front flange 36 extending from the channel-shaped lower body toward the front door opening 2, and the rear flange 37 extending from the channel-shaped lower body toward the rear door opening 3.

The front flange 36 of the lower inner portion 12b may extend from the transverse edge 31b of the front cut-out portion 31 of the upper inner portion 12a. The rear flange 37 of the lower inner portion 12b may extend from the transverse edge 32b of the rear cut-out portion 32 of the upper inner portion 12a. Since the transverse edge 32b of the rear cut-out portion 32 is located above the transverse edge 31b of the front cut-out portion 31, a top end of the rear flange 37 may be located higher than a top end of the front flange 36, and a length of the rear flange 37 may be greater than that of the front flange 36.

In some examples, the front flange 36 of the lower inner portion 12b of the pillar inner panel 12 may be fixed to the second front flange 21b of the lower outer portion 11b of the pillar outer panel 11 using fasteners, welding, and/or the like. The rear flange 37 of the pillar inner panel 12 may be fixed to the second rear flange 22b of the lower outer portion 11b of the pillar outer panel 11 using fasteners, welding, and/or the like.

Referring to FIG. 4, the lower inner portion 12b of the pillar inner panel 12 may include the channel-shaped lower body, a second front joint wall 33b extending from the channel-shaped lower body toward the front door opening 2, and a second rear joint wall 34b extending from the channel-shaped lower body toward the rear door opening 3. The second front joint wall 33b may be closer to the center of the lower inner portion 12b of the pillar inner panel 12 than the front flange 36, and the second rear joint wall 34b may be closer to the center of the lower inner portion 12b of the pillar inner panel 12 than the rear flange 37.

The second front joint wall 33b and the second rear joint wall 34b may be flat, and the second front joint wall 33b may be aligned with the second rear joint wall 34b along the longitudinal direction of the vehicle. The second front joint wall 33b of the lower inner portion 12b may extend continuously from the first front joint wall 33a of the upper inner portion 12a, and the second rear joint wall 34b of the lower inner portion 12b may extend continuously from the first rear joint wall 34a of the upper inner portion 12a.

The lower inner portion 12b of the pillar inner panel 12 may include a second recessed wall 35b recessed from the second front joint wall 33b and the second rear joint wall 34b toward the exterior of the vehicle, a second front connection wall 38b connecting a front edge of the second recessed wall 35b and the second front joint wall 33b, a second rear connection wall 39b connecting a rear edge of the second recessed wall 35b and the second rear joint wall 34b, a front wall 36a facing the front of the vehicle, and a rear wall 37a facing the rear of the vehicle.

The second recessed wall 35b may be recessed from the second front joint wall 33b and the second rear joint wall 34b toward the second outboard wall 23b of the lower outer portion 11b of the pillar outer panel 11. The second recessed wall 35b may be flat, and the second front connection wall 38b and the second rear connection wall 39b may be inclined. The front wall 36a may extend obliquely from the front flange 36 to the second front joint wall 33b. The rear wall 37a may extend obliquely from the rear flange 37 to the second rear joint wall 34b.

Referring to FIG. 4, the second recessed wall 35b, the second front connection wall 38b, and the second rear connection wall 39b may form the channel-shaped lower body, the second front joint wall 33b and the front wall 36a may connect the channel-shaped lower body and the front flange 36, and the second rear joint wall 34b and the rear wall 37a may connect the channel-shaped lower body and the rear flange 37 so that stiffness and strength of the lower inner portion 12b of the pillar inner panel 12 may be improved.

The second recessed wall 35b of the lower inner portion 12b may extend continuously from the first recessed wall 35a of the upper inner portion 12a. The second front connection wall 38b of the lower inner portion 12b may extend continuously from the first front connection wall 38a of the upper inner portion 12a. The second rear connection wall 39b of the lower inner portion 12b may extend continuously from the first rear connection wall 39a of the upper inner portion 12a.

In some implementations, the center pillar 10 may include an upper reinforcing member 13 mounted on the upper portion 10a of the center pillar 10. Referring to FIG. 3, the upper reinforcing member 13 may be disposed between the upper outer portion 11a of the pillar outer panel 11 and the upper inner portion 12a of the pillar inner panel 12.

The upper reinforcing member 13 may extend in the vertical direction of the vehicle. Referring to FIG. 3, the upper reinforcing member 13 may include a channel-shaped body and one or more upper member flanges. For example, the one or more upper member flanges may include a front flange 41 extending from the channel-shaped body toward the front door opening 2, and a rear flange 42 extending from the channel-shaped body toward the rear door opening 3.

The front flange 41 may be flat, and the front flange 41 may be directly fixed to the first front flange 21a of the upper outer portion 11a of the pillar outer panel 11 using fasteners, welding, and/or the like. Referring to FIGS. 1 and 3, the front cut-out portion 31 of the upper inner portion 12a of the pillar inner panel 12 may be aligned with the front flange 41 of the upper reinforcing member 13, and thus the front flange 41 of the upper reinforcing member 13 may be exposed through the front cut-out portion 31 of the upper inner portion 12a of the pillar inner panel 12.

The rear flange 42 may be flat, and the rear flange 42 may be directly fixed to the first rear flange 22a of the upper outer portion 11a of the pillar outer panel 11 using fasteners, welding, and/or the like. Referring to FIGS. 1 and 3, the rear cut-out portion 32 of the upper inner portion 12a of the pillar inner panel 12 may be aligned with the rear flange 42 of the upper reinforcing member 13, and thus the rear flange 42 of the upper reinforcing member 13 may be exposed through the rear cut-out portion 32 of the upper inner portion 12a of the pillar inner panel 12.

The cut-out portions 31 and 32 of the upper inner portion 12a of the pillar inner panel 12 may be aligned with the corresponding flanges 41 and 42 of the upper reinforcing member 13, thereby preventing the flange portions of the upper portion 10a of the center pillar 10 from being excessively thick.

The upper reinforcing member 13 may include a reinforcing wall 43 opposing the first outboard wall 23a of the upper outer portion 11a of the pillar outer panel 11, a front wall 46 connected to a front edge of the reinforcing wall 43, a rear wall 47 connected to a rear edge of the reinforcing wall 43, a front joint wall 44 extending from the front wall 46 toward the front of the vehicle, and a rear joint wall 45 extending from the rear wall 47 toward the rear of the vehicle.

The reinforcing wall 43 may be located between the first outboard wall 23a of the upper outer portion 11a of the pillar outer panel 11 and the first recessed wall 35a of the upper inner portion 12a of the pillar inner panel 12. Accordingly, the reinforcing wall 43 may face the first outboard wall 23a of the upper outer portion 11a of the pillar outer panel 11 and the first recessed wall 35a of the upper inner portion 12a of the pillar inner panel 12.

The reinforcing wall 43 may be recessed from the front flange 41, the front joint wall 44, the rear flange 42, and the rear joint wall 45 toward the upper outer portion 11a of the pillar outer panel 11. The reinforcing wall 43 may be flat, and the reinforcing wall 43 may be located in the upper cavity 11c of the pillar outer panel 11.

The front wall 46 may face the first front wall 24a of the upper outer portion 11a of the pillar outer panel 11, and the front wall 46 may extend from the reinforcing wall 43 to the front joint wall 44. At least a portion of the front wall 46 may be located in the upper cavity 11c of the upper outer portion 11a of the pillar outer panel 11.

The rear wall 47 may face the first rear wall 25a of the upper outer portion 11a of the pillar outer panel 11, and the rear wall 47 may extend from the reinforcing wall 43 to the rear joint wall 45. At least a portion of the rear wall 47 may be located in the upper cavity 11c of the upper outer portion 11a of the pillar outer panel 11.

The front joint wall 44 may be raised from the front flange 41 and the reinforcing wall 43 toward the upper inner portion 12a of the pillar inner panel 12. The front joint wall 44 may be directly fixed to the first front joint wall 33a of the upper inner portion 12a of the pillar inner panel 12 using fasteners, welding, and/or the like.

The rear joint wall 45 may be raised from the rear flange 42 and the reinforcing wall 43 toward the upper inner portion 12a of the pillar inner panel 12, and the rear joint wall 45 may be directly fixed to the first rear joint wall 34a of the upper inner portion 12a of the pillar inner panel 12 using fasteners, welding, and/or the like.

The upper reinforcing member 13 may have a front connection wall 41a extending from the front flange 41 to the front joint wall 44, and a rear connection wall 42a extending from the rear flange 42 to the rear joint wall 45.

The reinforcing wall 43, the front wall 46, and the rear wall 47 may form a channel-shaped body, the front joint wall 44 and the front connection wall 41a may connect the channel-shaped body and the front flange 41, and the rear joint wall 45 and the rear connection wall 42a may connect the channel-shaped body and the rear flange 42 so that stiffness and strength of the upper reinforcing member 13 may be improved. The reinforcing wall 43, at least a portion of the front wall 46, and at least a portion of the rear wall 47 may be located in the upper cavity 11c of the pillar outer panel 11, and thus the strength and stiffness of the upper portion 10a of the center pillar 10 may be improved.

Referring to FIG. 2, a bottom end of the upper reinforcing member 13 may be located below the beltline 8. Accordingly, a lower portion of the upper reinforcing member 13 located below the beltline 8 may be disposed between the lower outer portion 11b of the pillar outer panel 11 and the lower inner portion 12b of the pillar inner panel 12.

Referring to FIG. 2, the upper reinforcing member 13 may include a first lower edge 48a provided on the bottom end thereof, a second lower edge 48b, and a third lower edge 48c.

The first lower edge 48a, the second lower edge 48b, and the third lower edge 48c may be located below the beltline 8. The first lower edge 48a may be closer to the front door opening 2 than the second lower edge 48b. The first lower edge 48a may extend along the beltline 8, and the first lower edge 48a may be parallel to the beltline 8.

The second lower edge 48b may be closer to the rear door opening 3 than the first lower edge 48a, and accordingly the second lower edge 48b may be located behind the first lower edge 48a. The second lower edge 48b may extend along the beltline 8, and the second lower edge 48b may be parallel to the beltline 8. The first lower edge 48a may be parallel to the second lower edge 48b.

As the first lower edge 48a is located below the second lower edge 48b, a front portion of the upper reinforcing member 13 may be longer than a rear portion of the upper reinforcing member 13. Accordingly, an area of the front portion of the upper reinforcing member 13 may be greater than that of the rear portion of the upper reinforcing member 13, and thus strength of the front portion of the upper reinforcing member 13 may be higher than that of the rear portion of the upper reinforcing member 13.

The third lower edge 48c may be located between the first lower edge 48a and the second lower edge 48b, and the third lower edge 48c may extend from the first lower edge 48a to the second lower edge 48b. In particular, the third lower edge 48c may extend obliquely.

As the first lower edge 48a is located below the second lower edge 48b, strength of the bottom end of the upper reinforcing member 13 may be improved. As the first lower edge 48a and the second lower edge 48b are located at different heights, and the third lower edge 48c is inclined, a relatively complex fracture path may be provided at the bottom end of the upper reinforcing member 13, thereby increasing resistance to fracture of the center pillar 10.

Referring to FIG. 3, the upper reinforcing member 13 may have a cavity 13a defined by the reinforcing wall 43, the front wall 46, and the rear wall 47. The first recessed wall 35a, the first front connection wall 38a, and the first rear connection wall 39a of the upper inner portion 12a of the pillar inner panel 12 may be located in the cavity 13a of the upper reinforcing member 13. Accordingly, the strength and stiffness of the upper portion 10a of the center pillar 10 may be improved.

The center pillar 10 may include a lower reinforcing member 14 mounted on the lower portion 10b of the center pillar 10. Referring to FIG. 4, the lower reinforcing member 14 may be interposed between the lower outer portion 11b of the pillar outer panel 11 and the lower inner portion 12b of the pillar inner panel 12.

The lower reinforcing member 14 may extend in the vertical direction of the vehicle. Referring to FIG. 4, the lower reinforcing member 14 may include a channel-shaped body and one or more lower member flanges. For example, the lower member flanges may include a front flange 51 extending from the channel-shaped body toward the front door opening 2, and a rear flange 52 extending from the channel-shaped body toward the rear door opening 3.

The front flange 51 may be flat, and the front flange 51 may be directly fixed to the second front joint wall 33b of the lower inner portion 12b of the pillar inner panel 12 using fasteners, welding, and/or the like.

The rear flange 52 may be flat, and the rear flange 52 may be directly fixed to the second rear joint wall 34b of the lower inner portion 12b of the pillar inner panel 12 using fasteners, welding, and/or the like.

The front flange 51 may be aligned with the rear flange 52 along the longitudinal direction of the vehicle. The flanges 51 and 52 of the lower reinforcing member 14 may be fixed to the joint walls 33b and 34b of the lower inner portion 12b of the pillar inner panel 12, respectively, which may prevent the flange portions of the lower portion 10b of the center pillar 10 from being excessively thick.

The lower reinforcing member 14 may include a reinforcing wall 53 opposing the second outboard wall 23b of the lower outer portion 11b of the pillar outer panel 11, a front wall 54 connected to a front edge of the reinforcing wall 53, and a rear wall 55 connected to a rear edge of the reinforcing wall 53. The reinforcing wall 53 may be located between the second outboard wall 23b of the lower outer portion 11b of the pillar outer panel 11 and the second recessed wall 35b of the lower inner portion 12b of the pillar inner panel 12. Accordingly, the reinforcing wall 53 may face the second outboard wall 23b of the lower outer portion 11b of the pillar outer panel 11 and the second recessed wall 35b of the lower inner portion 12b of the pillar inner panel 12.

The reinforcing wall 53 may be recessed from the front flange 51 and the rear flange 52 toward the lower outer portion 11b of the pillar outer panel 11, and the reinforcing wall 53 may face the second outboard wall 23b of the lower outer portion lib. The reinforcing wall 53 may be flat. The reinforcing wall 53 may be located in the lower cavity 11d of the pillar outer panel 11. The front flange 51 and the rear flange 52 may be raised from the reinforcing wall 53 toward the lower inner portion 12b of the pillar inner panel 12.

The front wall 54 may face the second front wall 24b of the lower outer portion 11b of the pillar outer panel 11, and the front wall 54 may extend from the reinforcing wall 53 to the front flange 51. At least a portion of the front wall 54 may be located in the lower cavity 11d of the lower outer portion 11b of the pillar outer panel 11.

The rear wall 55 may face the second rear wall 25b of the lower outer portion 11b of the pillar outer panel 11, and the rear wall 55 may extend from the reinforcing wall 53 to the rear flange 52. At least a portion of the rear wall 55 may be located in the lower cavity 11d of the lower outer portion 11b of the pillar outer panel 11.

Referring to FIG. 4, the lower reinforcing member 14 may have a cavity 14a defined by the reinforcing wall 53, the front wall 54, and the rear wall 55. The second recessed wall 35b, the second front connection wall 38b, and the second rear connection wall 39b of the lower inner portion 12b of the pillar inner panel 12 may be located in the cavity 14a of the lower reinforcing member 14. Accordingly, the strength and stiffness of the lower portion 10b of the center pillar 10 may be improved.

Referring to FIG. 2, a top end of the lower reinforcing member 14 (see a dotted line in FIG. 2) may be located above the beltline 8. Accordingly, an upper portion of the lower reinforcing member 14 located above the beltline 8 may be disposed between the upper outer portion 11a of the pillar outer panel 11 and the upper reinforcing member 13.

Referring to FIG. 2, the lower reinforcing member 14 may include a first upper edge 58a provided on the top end thereof and a second upper edge 58b. The top end of the lower reinforcing member 14 may be spaced upwardly apart from the bottom end of the upper reinforcing member 13, and the upper portion of the lower reinforcing member 14 may overlap the lower portion of the upper reinforcing member 13.

The first upper edge 58a and the second upper edge 58b may be located above the beltline 8. The first upper edge 58a may extend along the beltline 8, and the first upper edge 58a may be parallel to the beltline 8. The second upper edge 58b may extend obliquely and downwardly from the first upper edge 58a.

A bottom end of the second upper edge 58b of the lower reinforcing member 14 may be spaced apart from the first lower edge 48a of the upper reinforcing member 13 by a first distance S1. The first upper edge 58a of the lower reinforcing member 14 may be spaced apart from the second lower edge 48b of the upper reinforcing member 13 by a second distance S2. The first distance S1 and the second distance S2 may be equal to or be different from each other. The upper portion of the lower reinforcing member 14 and the lower portion of the upper reinforcing member 13 may be overlapped to have a predetermined overlap area, and the overlapped portion of the lower reinforcing member 14 and the upper reinforcing member 13 may be aligned with the beltline 8. The upper portion of the lower reinforcing member 14 and the lower portion of the upper reinforcing member 13 may be joined by spot welding, and accordingly joining stiffness between the upper portion of the lower reinforcing member 14 and the lower portion of the upper reinforcing member 13 may be improved. The lower portion of the upper reinforcing member 13 may be fixed to the upper portion of the lower reinforcing member 14 by two parallel spaced rows of weld-spots.

In some implementations, the pillar outer panel 11 may include a high strength steel material. Specifically, the pillar outer panel 11 may include hot stamped steel having a minimum tensile strength of 1470 MPa. That is, the pillar outer panel 11 may be made of 1470 MPa grade steel. The hot stamped steel may be a high strength steel material easily manufactured by hot stamping or press hardening.

The steel material such as hot stamped steel may have high strength, but be vulnerable to fracture. Accordingly, the pillar outer panel 11 may be formed to be relatively thin. For example, the thickness of the pillar outer panel 11 may be 1.1 mm. Accordingly, the thickness of each of the flanges 21a, 21b, 22a, and 22b of the pillar outer panel 11 may be 1.1 mm.

In some implementations, the upper reinforcing member 13 may include a high strength steel material. Specifically, the upper reinforcing member 13 may include hot stamped steel having a minimum tensile strength of 1470 MPa. That is, the upper reinforcing member 13 may be made of 1470 MPa grade steel which is the same as that of the pillar outer panel 11. The hot stamped steel may be a high strength steel material easily manufactured by hot stamping or press hardening.

The flanges 41 and 42 of the upper reinforcing member 13 including the hot stamped steel may be fixed to the corresponding flanges 21a and 22a of the upper outer portion 11a of the pillar outer panel 11 including the hot stamped steel, respectively, so that the strength of the upper portion 10a of the center pillar may be significantly improved. The cut-out portions 31 and 32 of the pillar inner panel 12 may be aligned with the corresponding flanges 41 and 42 of the upper reinforcing member 13, respectively, which may prevent the flange portions of the upper portion 10a of the center pillar 10 from being excessively thick, and may reduce the weight of the upper portion 10a of the center pillar 10.

The thickness of the upper reinforcing member 13 may be greater than that of the pillar outer panel 11. Accordingly, the thickness of the front flange portion and the thickness of the rear flange portion in the upper portion 10a of the center pillar may be optimized in response to roof strength of the vehicle. For example, the thickness of the upper reinforcing member 13 may be 1.4 mm.

In a center pillar according to the related art, an upper reinforcing member may be made of steel having a minimum tensile strength of 980 MPa and a thickness of 1.8 mm. On the other hand, the upper reinforcing member 13 may be made of steel having a minimum tensile strength of 1470 MPa and a thickness of 1.4 mm. Since the strength of the upper reinforcing member 13 is higher than that of the upper reinforcing member according to the related art, the strength of the upper portion 10a of the center pillar may be improved, and thus the roof strength of the vehicle may be improved. In addition, since the thickness of the upper reinforcing member 13 is less than that of the upper reinforcing member according to the related art, the weight of the upper reinforcing member 13 may be reduced. For example, the weight of the upper reinforcing member 13 may be reduced by 300 g. Since the upper reinforcing member 13 has relatively high strength and is relatively thin, the strength of the upper portion 10a of the center pillar 10 may be increased. The weight of the upper reinforcing member 13 may be reduced, and thus the center pillar may achieve improved functional efficiency and cost efficiency.

In some implementations, the pillar inner panel 12 may include a high strength steel material of which strength is relatively lower than that of the pillar outer panel 11. Specifically, the pillar inner panel 12 may include cold rolled steel having a minimum tensile strength of 780 MPa. That is, the pillar inner panel 12 may be made of 780 MPa grade steel.

Since the strength of the pillar inner panel 12 is lower than the strength of the pillar outer panel 11, resistance to fracture may increase at the lower portion 10b of the center pillar 10. The thickness of the pillar inner panel 12 may be greater than the thickness of the pillar outer panel 11. For example, the pillar inner panel 12 may have a thickness of 1.4 mm.

In the related art center pillar, a pillar inner panel may be made of steel having a minimum tensile strength of 980 MPa and a thickness of 1.6 mm. On the other hand, the pillar inner panel 12 may be made of steel having a minimum tensile strength of 780 MPa and a thickness of 1.4 mm. Since the strength of the pillar inner panel 12 is lower than the strength of the pillar inner panel according to the related art, cross-section stiffness and side crash performance may be improved at the lower portion 10b of the center pillar 10. In addition, since the thickness of the pillar inner panel 12 is less than the thickness of the pillar inner panel according to the related art, the weight of the pillar inner panel 12 may be reduced. For example, the weight of the pillar inner panel 12 may be reduced by 500 g.

In some implementations, since the pillar inner panel 12 has relatively low strength and is relatively thin, the stiffness of the lower portion 10b of the center pillar 10 may be increased, and the weight of the pillar inner panel 12 may be reduced, and thus the center pillar 10 may achieve improved functional efficiency and cost efficiency.

The flanges 36 and 37 of the lower inner portion 12b of the pillar inner panel 12 may be fixed to the corresponding flanges 21b and 22b of the lower outer portion 11b of the pillar outer panel 11 including the hot stamped steel, respectively, so that stiffness of each flange portion of the lower portion 10b of the center pillar 10 may be improved.

In some implementations, the lower reinforcing member 14 may include a high strength steel material of which strength is relatively lower than that of the pillar inner panel 12. Specifically, the lower reinforcing member 14 may include cold rolled steel having a minimum tensile strength of 590 MPa. That is, the lower reinforcing member 14 may be made of 590 MPa grade steel.

The strength of the lower reinforcing member 14 may be lower than the strength of the pillar inner panel 12, and the thickness of the lower reinforcing member 14 may be greater than the thickness of the pillar inner panel 12. For example, the thickness of the lower reinforcing member 14 may be 1.8 mm.

The lower reinforcing member 14 may have the lowest strength compared to the pillar outer panel 11, the pillar inner panel 12, and the upper reinforcing member 13, and the lower reinforcing member 14 may have the greatest thickness compared to the pillar outer panel 11, the pillar inner panel 12, and the upper reinforcing member 13. Accordingly, the resistance to fracture of the lower portion 10b of the center pillar 10 may be increased, and the cross-section stiffness and side crash performance of the lower portion 10b of the center pillar 10 may be improved.

The flanges 36 and 37 of the lower inner portion 12b of the pillar inner panel 12 including the cold rolled steel may be fixed to the corresponding flanges 21b and 22b of the lower outer portion 11b of the pillar outer panel 11 including the hot stamped steel, respectively, and the flanges 51 and 52 of the lower reinforcing member 14 including the lowest strength steel may be fixed to the corresponding joint walls 33b and 34b of the lower inner portion 12b of the pillar inner panel 12 including the hot stamped steel, respectively, so that the cross-section stiffness and side crash performance of the lower portion 10b of the center pillar 10 may be improved.

In some implementations, the flanges of the upper reinforcing member may be fixed to the corresponding first flanges of the upper outer portion of the pillar outer panel, and the upper reinforcing member may include the steel material having the same strength as that of the pillar outer panel so that the upper portion of the center pillar may improve the roof strength of the vehicle. In particular, the cut-out portions of the upper inner portion of the pillar inner panel may be aligned with the corresponding flanges of the upper reinforcing member, respectively, which may prevent the flange portions of the upper portion of the center pillar from being excessively thick, and may reduce the weight of the upper portion of the center pillar.

In some implementations, the flanges of the lower inner portion of the pillar inner panel may be fixed to the corresponding second flanges of the lower outer portion of the pillar outer panel, and the pillar inner panel may include the steel material with lower strength than that of the pillar outer panel so that the lower portion of the center pillar may improve the side crash performance of the vehicle. In particular, the flanges of the lower reinforcing member including the steel material with lower strength than that of the pillar inner panel may be fixed to the corresponding second joint walls of the lower inner portion of the pillar inner panel, respectively, which may prevent the flange portions of the lower portion of the center pillar from being excessively thick, and may reduce the weight of the lower portion of the center pillar.

Hereinabove, although the present disclosure has been described with reference to exemplary implementations and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A center pillar of a vehicle, comprising:
    a pillar outer panel including an upper outer portion located above a reference line and a lower outer portion located below the reference line, the upper outer portion comprising a first flange that extends toward a door opening of the vehicle;
    a pillar inner panel including an upper inner portion located above the reference line and a lower inner portion located below the reference line; and
    an upper reinforcing member located between the upper outer portion and the upper inner portion, the upper reinforcing member comprising:
        an upper member flange that extends toward the door opening and is fixed to the first flange of the upper outer portion,
        a reinforcing wall recessed from the upper member flange toward the upper outer portion, and
        a joint wall raised from the reinforcing wall toward the upper inner portion, and wherein the upper inner portion comprises a first joint wall fixed to the joint wall of the upper reinforcing member.

2. The center pillar according to claim 1, wherein the upper inner portion is fixed to the upper reinforcing member.

3. The center pillar according to claim 1, wherein the upper inner portion comprises a first recessed wall recessed from the first joint wall toward the upper outer portion.

4. The center pillar according to claim 1, further comprising a lower reinforcing member located between the lower outer portion and the lower inner portion,
wherein the lower reinforcing member is fixed to the lower inner portion.

5. The center pillar according to claim 4, wherein the lower outer portion comprises a second flange extending toward the door opening,
wherein the lower inner portion has a flange that extends toward the door opening and is fixed to the second flange of the lower outer portion.

6. The center pillar according to claim 5, wherein the lower reinforcing member further comprises:
a reinforcing wall that faces the lower outer portion; and
a lower member flange raised from the reinforcing wall toward the lower inner portion, and
wherein the lower inner portion comprises a second joint wall fixed to the lower member flange of the lower reinforcing member.

7. The center pillar according to claim 6, wherein the lower inner portion comprises a second recessed wall recessed from the second joint wall toward the lower outer portion.

8. The center pillar according to claim 1, wherein a bottom end of the upper reinforcing member is located below the reference line, and
wherein the upper reinforcing member has:
a first lower edge located at the bottom end of the upper reinforcing member,
a second lower edge located above the first lower edge, and
a third lower edge that connects the first lower edge and the second lower edge to each other.

9. The center pillar according to claim 4, wherein a top end of the lower reinforcing member is located above the reference line, and
wherein the lower reinforcing member comprises:
a first upper edge located at the top end of the lower reinforcing member; and
a second upper edge that extends downward from the first upper edge and is inclined with respect to the first upper edge.

10. The center pillar according to claim 4, wherein a lower portion of the upper reinforcing member and an upper portion of the lower reinforcing member overlap each other to thereby define a predetermined overlap area, and
wherein the lower portion of the upper reinforcing member is coupled to the upper portion of the lower reinforcing member by spot welding.

11. The center pillar according to claim 1, wherein the pillar outer panel and the upper reinforcing member are made of hot stamped steel.

12. The center pillar according to claim 4, wherein the pillar inner panel and the lower reinforcing member are made of cold rolled steel.

13. The center pillar according to claim 1, wherein the pillar outer panel faces an exterior of the vehicle, and
wherein the pillar inner panel faces an interior of the vehicle.

14. The center pillar according to claim 1, wherein the center pillar is located between a front door opening and a rear door opening of the vehicle that are arranged in a longitudinal direction of the vehicle, and
wherein the reference line is a beltline that extends in the longitudinal direction of the vehicle and passes through the front door opening and the rear door opening.

15. A center pillar of a vehicle, comprising:
a pillar outer panel including an upper outer portion located above a reference line and a lower outer portion located below the reference line, the upper outer portion comprising a first flange that extends toward a door opening of the vehicle;
a pillar inner panel including an upper inner portion located above the reference line and a lower inner portion located below the reference line and fixed to the first flange; and
a lower reinforcing member located between the lower outer portion and the lower inner portion,
wherein the lower reinforcing member is fixed to the lower inner portion, and
wherein the lower inner portion comprises a joint wall fixed to a lower member flange of the lower reinforcing member.

16. The center pillar according to claim 15, wherein the lower reinforcing member further comprises a reinforcing wall that faces the lower outer portion, and
wherein the lower member flange is raised from the reinforcing wall toward the lower inner portion.

17. The center pillar according to claim 16, wherein the lower outer portion comprises a second flange extending toward the door opening, and
wherein the lower inner portion has a flange that extends toward the door opening and is fixed to the second flange of the lower outer portion.

18. The center pillar according to claim 15, wherein a top end of the lower reinforcing member is located above the reference line, and
wherein the lower reinforcing member comprises:
a first upper edge located at the top end of the lower reinforcing member; and
a second upper edge that extends downward from the first upper edge and is inclined with respect to the first upper edge.

19. A center pillar of a vehicle, comprising:
a pillar outer panel including an upper outer portion located above a reference line and a lower outer portion located below the reference line, the upper outer portion comprising a first flange that extends toward a door opening of the vehicle;
a pillar inner panel including an upper inner portion located above the reference line and a lower inner portion located below the reference line; and
an upper reinforcing member located between the upper outer portion and the upper inner portion, the upper reinforcing member comprising an upper member flange that extends toward the door opening and is fixed to the first flange of the upper outer portion,
wherein a bottom end of the upper reinforcing member is located below the reference line, and
wherein the upper reinforcing member has:
a first lower edge located at the bottom end of the upper reinforcing member,
a second lower edge located above the first lower edge, and a third lower edge that connects the first lower edge and the second lower edge to each other.

* * * * *